United States Patent
Valeri et al.

(10) Patent No.: US 9,899,018 B2
(45) Date of Patent: Feb. 20, 2018

(54) METHOD, SYSTEM AND APPARATUS FOR ADDRESSING ROAD NOISE

(71) Applicant: GM GLOBAL TECHNOLOGY OPERATIONS LLC, Detroit, MI (US)

(72) Inventors: Frank C Valeri, Novi, MI (US); Christophe A Stirlen, Milford, MI (US); Scott M. Reilly, Southfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/192,053

(22) Filed: Jun. 24, 2016

(65) Prior Publication Data

US 2017/0372690 A1     Dec. 28, 2017

(51) Int. Cl.
    *G10K 11/16*     (2006.01)
    *G10K 11/178*     (2006.01)
    *G07C 5/08*     (2006.01)
    *G01C 21/34*     (2006.01)

(52) U.S. Cl.
    CPC ........ *G10K 11/178* (2013.01); *G01C 21/3415* (2013.01); *G07C 5/085* (2013.01); *G10K 2210/12821* (2013.01)

(58) Field of Classification Search
    CPC ....... G10K 11/178; G10K 2210/12821; G01C 21/3415; G07C 5/085
    USPC .......... 381/71.4, 71.8, 71.11, 86, 389; 455/569.2, 570; 382/108
See application file for complete search history.

(56) References Cited

U.S. PATENT DOCUMENTS

| | | | | |
|---|---|---|---|---|
| 5,765,119 | A * | 6/1998 | Otabe | G01N 29/4481 701/59 |
| 2008/0188271 | A1* | 8/2008 | Miyauchi | G10K 11/1788 455/569.2 |
| 2010/0266134 | A1* | 10/2010 | Wertz | G10K 11/178 381/71.1 |
| 2015/0178572 | A1* | 6/2015 | Omer | G08G 1/0112 382/108 |
| 2016/0221581 | A1* | 8/2016 | Talwar | B60W 40/06 |
| 2017/0021768 | A1* | 1/2017 | Jaegal | B60Q 9/008 |

* cited by examiner

*Primary Examiner* — Vivian Chin
*Assistant Examiner* — Friedrich W Fahnert

(57) ABSTRACT

An apparatus and system for addressing road noise are provided. The apparatus is configured to determine at least one from among a location of a vehicle and a noise feature of a road on which the vehicle is traveling, retrieve road noise cancellation information based on the determined at least one from among the location of the vehicle and the noise feature of the road on which the vehicle is traveling, and output a signal to cancel road noise based on the road noise cancellation information. The apparatus may be installed in vehicle to address road noise heard by occupants of the vehicle.

18 Claims, 3 Drawing Sheets

METHOD, SYSTEM AND APPARATUS FOR ADDRESSING ROAD NOISE

INTRODUCTION

Apparatuses and methods consistent with exemplary embodiments relate to addressing road noise. More particularly, methods consistent with exemplary embodiments relate to addressing road noise by using various types of information related to a road.

SUMMARY

One or more exemplary embodiments provide a method, system and an apparatus that address road noise based on location information. Moreover, one or more exemplary embodiments provide a method, system and an apparatus to collect road noise information and location information in order to apply the appropriate road noise cancellation setting at a given location.

According to an aspect of an exemplary embodiment, an apparatus for addressing road noise is provided. The apparatus includes: at least one memory comprising computer executable instructions; and at least one processor configured to read and execute the computer executable instructions. The computer executable instructions cause the at least one processor to: determine at least one from among information on a location of a vehicle and information on a noise feature of a road on which the vehicle is traveling; retrieve road noise cancellation information based on the determined at least one from among the information on the location of the vehicle and the information on the noise feature of the road on which the vehicle is traveling; and output a signal to cancel road noise based on the road noise cancellation information.

The road noise cancellation information may include information to generate a signal that offsets noise created by the noise feature of the road.

The information on the location of the vehicle may include at least one from among a name of a road, a name of a city, a name of a state, a name of a country, a postal code, a segment of a road, a lane of a road and coordinate information.

The information on the noise feature of the road may include at least one from among a sound, a vibration, an ambient temperature, vehicle usage, a speed of a vehicle, a road surface type and a road surface feature.

The computer executable instructions may cause the at least one processor to retrieve the road noise cancellation information from a server.

The computer executable instructions may cause the at least one processor to: detect a noise level inside of the vehicle; generate new road noise cancellation information based on the detected noise level; and transmit the adjusted road noise cancellation information to a server.

According to an aspect of another exemplary embodiment, an apparatus for addressing road noise is provided. The apparatus includes at least one memory comprising computer executable instructions; and at least one processor configured to read and execute the computer executable instructions. The computer executable instructions cause the at least one processor to: receive at least one from among information on a location of a vehicle and information on a noise feature of a road on which the vehicle is traveling; retrieve road noise cancellation information based on the received at least one from among the information on the location of the vehicle and the information on the noise feature of the road on which the vehicle is traveling; and transmit the retrieved road noise cancellation information to the vehicle.

The road noise cancellation information may include information used to generate a signal that offsets noise created by the noise feature of the road.

The location of the vehicle may include at least one from among a name of a road, a name of a city, a name of a state, a name of a country, a postal code, a segment of a road, a lane of a road and coordinate information.

The information on the noise feature of the road may include at least one from among a sound, a vibration, an ambient temperature, vehicle usage, a speed of a vehicle, a road surface type and a road surface feature.

The computer executable instructions may further cause the at least one processor to: receive adjusted road noise cancellation information generated by detecting a noise level inside of the vehicle after the transmitted road noise cancellation information is applied; and replace the road noise cancellation information with the received adjusted road noise cancellation.

The computer executable instructions may further cause the at least one processor to: receive a noise level of an inside of the vehicle; generate new road noise cancellation information based on the received noise level; and transmit the adjusted road noise cancellation information to the vehicle.

The computer executable instructions may further cause the at least one processor to: based on the location of the vehicle, transmit at least one from among a route to travel on with a least amount of road noise and a lane to travel on with a least amount of road noise.

According to an aspect of another exemplary embodiment, an apparatus for addressing road noise is provided. The apparatus includes at least one memory comprising computer executable instructions; and at least one processor configured to read and execute the computer executable instructions, the computer executable instructions causing the at least one processor to: detect a noise feature of a road on which a vehicle is traveling and a location of the detected noise feature; generate road noise information based on the detected noise feature of the road; generate location information including the location of the detected noise feature of the road; and transmit the road noise information and the location information to a server.

The location of the vehicle may include at least one from among a name of a road, a name of a city, a name of a state, a name of a country, a postal code, a segment of a road, a lane of a road and coordinate information.

The detected noise feature of the road may include at least one from among a sound, a vibration, an ambient temperature, vehicle usage, a speed of a vehicle, a road surface type and a road surface feature.

According to an aspect of another exemplary embodiment, a system for addressing road noise is provided. The system includes a client device; and a server.

The client device is configured to determine at least one from among a location of a vehicle and a noise feature of a road on which the vehicle is traveling, receive road noise cancellation information based on the determined at least one from among the location of the vehicle and the noise feature of the road on which the vehicle is traveling from the server, and output a signal to cancel road noise based on the received road noise cancellation information.

The server is configured to receive the at least one from among the location of the vehicle and the noise feature of the road on which the vehicle is traveling, retrieve the road noise cancellation information based on the received at least one from among the location of the vehicle and the noise feature of the road on which the vehicle is traveling, and transmit the retrieved road noise cancellation information to the client.

The location of the vehicle may include at least one from among a name of a road, a name of a city, a name of a state, a name of a country, a postal code, a segment of a road, a lane of a road and coordinate information.

The detected noise feature of the road may include at least one from among a sound, a vibration, an ambient temperature, vehicle usage, a speed of a vehicle, a road surface type and a road surface feature.

The server may be further configured to transmit information on at least one from among a route to travel on with a least amount of road noise and a lane to travel on with a least amount of road noise based on the location of the vehicle.

Other objects, advantages and novel features of the exemplary embodiments will become more apparent from the following detailed description of exemplary embodiments and the accompanying drawings.

DETAILED DESCRIPTION

Figure 1:
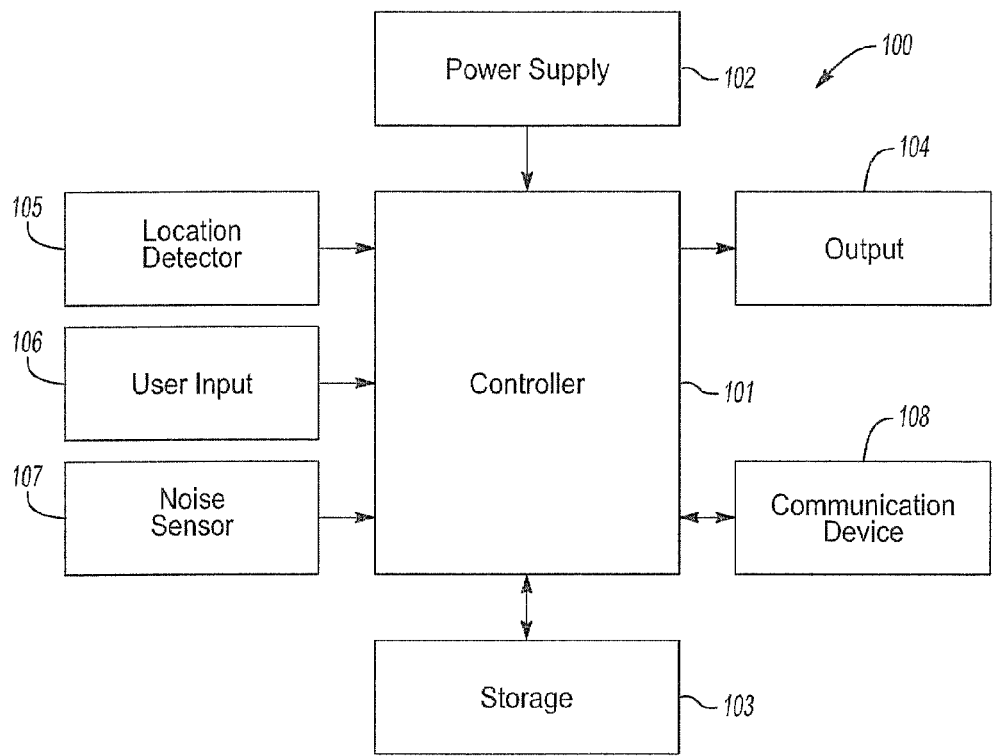
FIG. 1 shows a block diagram of an apparatus that addresses road noise according to an aspect of an exemplary embodiment.

An apparatus, system and method that address road noise will now be described in detail with reference to FIGS. 1-5 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "formed on," or "disposed on" a second element, the first element may be connected directly to, formed directly on or disposed directly on the second element or there may be intervening elements between the first element and the second element, unless it is stated that a first element is "directly" connected to, formed on, or disposed on the second element. In addition, if a first element is configured to "receive" information from a second element, the first element may receive the information directly from the second element, receive the information via a bus, receive the information via a network, or receive the information via intermediate elements, unless the first element is indicated to receive information "directly" from the second element.

Throughout the disclosure, one or more of the elements disclosed may be combined into a single device or combined into one or more devices. In addition, individual elements may be provided on separate devices.

Road noise is an audible sound heard by an occupant of a vehicle while a vehicle is traveling along a surface. Road noise may be caused by external factors, vehicle components, and a combination of external factors and vehicle components. External factors may include wind, road surface material, road surface features such as bumps and potholes. Vehicle components may also transmit or amplify road noise during operation of the vehicle components as the vehicles moves along a road. For example, noise created by vibrations caused by the road surface can be transmitted through or amplified by vehicle components.

FIG. 1 shows a block diagram of an apparatus that addresses road noise 100 according to an exemplary embodiment. As shown in FIG. 1, the apparatus that addresses road noise 100, according to an exemplary embodiment, includes a controller 101, a power supply 102, a storage 103, an output 104, a location detector 105, a user input 106, a noise sensor 107, and a communication device 108. However, the apparatus that addresses road noise 100 is not limited to the aforementioned configuration and may be configured to include additional elements and/or omit one or more of the aforementioned elements.

The controller 101 controls the overall operation and function of the apparatus that addresses road noise 100. The controller 101 may control, send, and/or receive information from one or more of the storage 103, the output 104, the location detector 105, the user input 106, the noise sensor 107, and the communication device 108 of the apparatus that addresses road noise 100. The controller 101 may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components.

The power supply 102 provides power to one or more of the controller 101, the storage 103, the output 104, the location detector 105, the user input 106, the noise sensor 107, and the communication device 108 of the apparatus that addresses road noise 100. The power supply 102 may include one or more from a battery, an outlet, a capacitor, a solar energy cell, a generator, a wind energy device, an alternator, etc.

The storage 103 is configured for storing information and retrieving information used by the apparatus that addresses road noise 100. The storage 103 may include the computer instructions configured to be executed by a processor to perform the functions of the apparatus that addresses road noise 100. The storage 103 may also be controlled by the controller 101 to store and retrieve road noise cancellation information, information on a location of the vehicle, information on a noise feature of the road on which vehicle is traveling, information on a vehicle, information on passengers of a vehicle, information on a route of travel, and timestamp information.

The road noise cancellation information may be information used to generate a signal that offsets road noise, e.g., information on one or more waveforms to be output to cancel road noise. The information on a location of the vehicle may include at least one from among a name of a road, a name of a city, a name of a state, a name of a country, a postal code, a segment of a road, a lane of a road and coordinate information. The information on the noise feature of the road may include at least one from among a sound, a vibration, an ambient temperature, vehicle usage, severity information, a speed of a vehicle, a road surface type and a road surface feature. The severity information may indicate a degree of damage to a road. The information on passengers of a vehicle may include a number of passengers in a vehicle and passenger location in a vehicle. The information on a vehicle may include information on a speed of a vehicle, information on a direction of travel, information on vehicle components such as windows, lift-gates, sunroofs, seat positions, etc.

The road surface feature may be a pothole, bump, a wet surface, a dry surface, etc. The road surface type may be concrete, asphalt, gravel, dirt, etc. The sound may be detected by transducers, microphones, etc., placed at various locations around a vehicle including, the interior cabin, the wheel well, etc. The vibrations may be detected by sensors such as accelerometers placed at various locations around a vehicle including, the interior cabin, the steering wheel, the wheel well, etc. The information on a route of travel may include information on at least one from among a route to travel on with a least amount of road noise and a lane to travel on with a least amount of road noise based on the location of the vehicle. The timestamp information may indicate times at the road noise information and road noise cancellation information are recorded.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The storage 103 may include a database that is configured to store road noise cancellation information, information on a location of the vehicle, information on a noise feature of the road on which vehicle is traveling, information on a vehicle, information on passengers of a vehicle, information on a route of travel, and timestamp information. For example, an entry in the database may include one or more from among information on a location of the vehicle, information on a noise feature associated with the location, timestamp information indicating a time the noise feature was detected, and road noise cancellation information used to cancel out noise generated by the noise feature.

The output 104 outputs information one or more forms, including: in visual, audible and haptic. The output 104 may be controlled by the controller 101 to provide outputs to the user of the apparatus that addresses road noise 100. The output 104 may include one or more from among a speaker, a piezoelectric actuator, a centrally-located display, a head up display, a windshield display, haptic feedback device, a vibration device, a tactile feedback device, a tap-feedback device, a holographic display, an instrument light, an indicator light, a spotlight directed.

The output 104 may display information indication that road noise cancellation is being performed. In addition, the output 104 output notification including one or more from among an audible notification, a light notification, etc. The output 104 is also configured to output a waveform based on a signal generated from road noise cancellation information. For example, a speaker may output sound at a frequency that offsets a frequency of road noise. In another example, a speaker may output broadband counter noise to cancel noise of a plurality of frequencies.

The location detector 105 is configured to detect information on a location of the vehicle. The information on the location of the vehicle may be detected by or from one or more from among global positioning system (GPS) device, a speedometer, a compass, an accelerometer, a camera, a laser sensor, an infrared sensor, an ultrasonic sensor, a near field communication sensor, a vehicle information bus, etc. For example, the GPS device may detect coordinates and the coordinates may be used along with information from a speedometer, a compass, an accelerometer, a camera to determine location information such as a name of a road, a name of a city, a name of a state, a name of a country, a postal code, a segment of a road, a lane of a road and/or coordinate information.

The user input 106 is configured to provide information and commands to the apparatus that addresses road noise 100. The user input 106 may be used to provide user inputs, etc. to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to activate or deactivate the apparatus that addresses road noise 100 or the output of the noise cancellation waveform.

The noise sensor 107 is configured to detect a noise generating feature (i.e., noise feature) of a road on which the vehicle is traveling. For example, the noise sensor may include one or more transducers, one or more microphones, an accelerometer, etc. The one or more transducers, microphones and/or accelerometers may be placed at various locations on a vehicle. For example, the one or more microphones and/or accelerometers may be placed in the cabin of the vehicle, vehicle structure, body mounts, wheel bearings, an engine compartment, and/or a wheel well, etc. The microphones can detect audible waveforms and information on the audible waveform may be recorded by the controller 101 and stored in storage 103.

The communication device 108 may be used by the apparatus that addresses road noise 100 to communicate with various types of external apparatuses according to various communication methods. The communication device 108 may be used to send/receive road noise cancellation information, information on a location of the vehicle, information on a noise feature of the road on which vehicle is traveling, and information on a route of travel, and timestamp information to/from a sever. The communication device 108 may also be configured to transmit/receive instructions to operate the apparatus that addresses road noise to/from a mobile device such as mobile phone, smart watch, laptop, tablet, etc.

The communication device 108 may include various communication modules such as a broadcast receiving module, a near field communication (NFC) module, a GPS module, a wired communication module, and a wireless communication module. The broadcast receiving module may include a terrestrial broadcast receiving module including an antenna to receive a terrestrial broadcast signal, a demodulator, and an equalizer. The NFC module is a module that communicates with an external apparatus located at a nearby distance according to an NFC method. The GPS module is a module that receives a GPS signal from a GPS satellite and detects a current location. The wired communication module may be a module that receives information over a wired network such as a local area network, a controller area network (CAN), or an external network, via Ethernet cable, fiber optic cable, coaxial cable, etc. The wireless communication module is a module that is connected to an external network by using a wireless communication protocol such as Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long term evolution (LTE), Bluetooth, or ZigBee.

According to an exemplary embodiment, the controller 101 of the apparatus that addresses road noise 100 is configured to determine at least one from among a location of a vehicle and a noise feature of a road on which the vehicle is traveling, retrieve road noise cancellation information based on the determined at least one from among the location of the vehicle and the noise feature of the road on which the vehicle is traveling, and output a signal to cancel road noise based on the road noise cancellation information.

The controller 101 of the apparatus that addresses road noise 100 may be further configured to detect a noise level inside of the vehicle, generate new road noise cancellation information based on the detected noise level and transmit the adjusted road noise cancellation information to a server. According to an example, the controller 101 may store the adjusted road noise cancellation information locally and send periodic updates of adjusted road noise cancellation information to a server.

The controller 101 may generate or retrieve the noise cancellation information based on the noise feature of the road on which the vehicle is traveling. In particular, the controller 101 would use center frequency or spectral moment detected by the noise sensor 107 to determine the road type and resultant noise to cancel. For example, the controller 101 would detect frequency ranges in the information provided by the noise sensor 107. The detected frequency ranges are then compared to predetermined frequency ranges that represent predetermine noise features of road. According to one example, a microphone may detect a low frequency range (20-80 Hz) that corresponds to an impact boom from a dirt road, a middle frequency range (80-350 Hz) that corresponds to tire cavity noise from a stud damaged concrete (SDC) road, a high frequency range (350-1000 Hz) that corresponds to tonal annoyances from crosscut concrete road. This information is then used to generate or retrieve noise cancellation information used to cancel noise features of road. Additionally, the controller 101 may generate the noise cancellation information based on the speed of the vehicle, the number of occupants in the vehicle, and where the occupants are seated in the vehicle.

According to another exemplary embodiment, the controller 101 of the apparatus that addresses road noise 100 may be configured to receive at least one from among information on a location of a vehicle and information on a noise feature of a road on which the vehicle is traveling, retrieve road noise cancellation information based on the received at least one from among the information on the location of the vehicle and the information on the noise feature of the road on which the vehicle is traveling and transmit the retrieved road noise cancellation information to the vehicle.

The controller 101 of the apparatus that addresses road noise 100 may be further configured to receive a noise level of an inside of the vehicle, generate new road noise cancellation information based on the received noise level, and transmit the adjusted road noise cancellation information to the vehicle. In addition, the controller 101 may transmit at least one from among a route to travel on with a least amount of road noise and a lane to travel on with a least amount of road noise based on the location of the vehicle.

According to yet another exemplary embodiment, the controller 101 of the apparatus that addresses road noise 100 may be configured to detect a noise feature of a road on which a vehicle is traveling and a location of the detected noise feature, generate road noise information based on the detected noise feature of the road, to generate location information including the location of the detected noise feature of the road, and to transmit the road noise information and the location information to a server.

Figure 2:
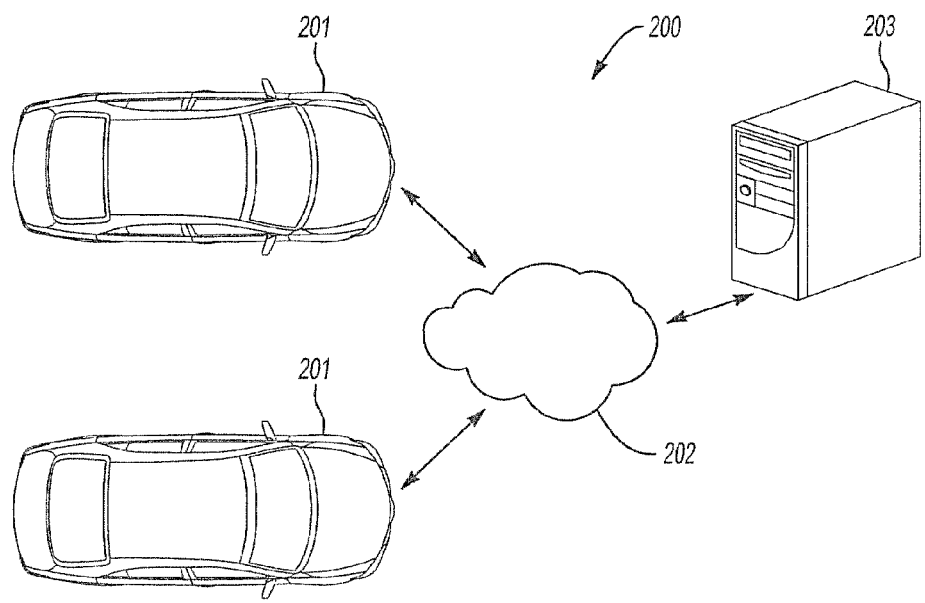
FIG. 2 shows a diagram of a system that addresses road noise according to an aspect of an exemplary embodiment.

FIG. 2 shows a diagram of a system 200 that addresses road noise according to an aspect of an exemplary embodiment. Referring to FIG. 2, vehicles 201 may transmit and receive information over network 202 to and from a server 203. The information that may be transmitted and/or received by the vehicle may include one or more from among road noise cancellation information, information on a location of the vehicle, information on a noise feature of the road on which vehicle is traveling, and information on a route of travel. The vehicles 201 and/or the server 203 may include one or more processors and configured to execute instructions stored in memory to perform functions to address road noise according to an aspect of an exemplary embodiment.

The vehicle may include a client device that is configured to determine at least one from among a location of a vehicle and a noise feature of a road on which the vehicle is traveling, receive road noise cancellation information based on the determined at least one from among the location of the vehicle and the noise feature of the road on which the vehicle is traveling from the server, and output a signal to cancel road noise based on the received road noise cancellation information. The server may be configured to receive the at least one from among the location of the vehicle and the noise feature of the road on which the vehicle is traveling, retrieve the road noise cancellation information based on the received at least one from among the location of the vehicle and the noise feature of the road on which the vehicle is traveling, and transmit the retrieved road noise cancellation information to the client.

Figure 3:
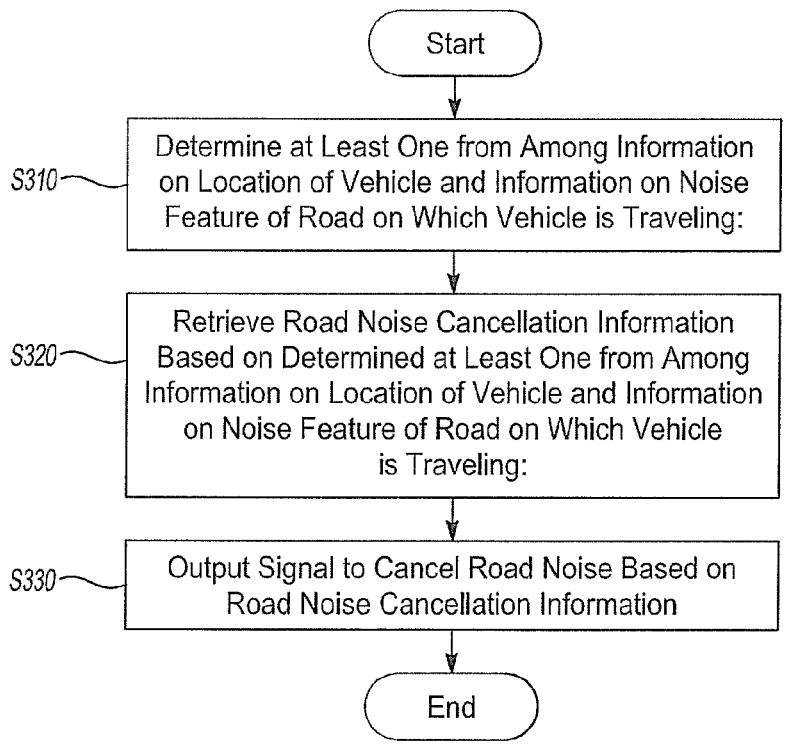
FIG. 3 shows a flowchart for a method of addressing road noise according to an aspect of another exemplary embodiment.

FIG. 3 shows a flowchart for a method of addressing road noise according to an aspect of another exemplary embodiment. The method of FIG. 3 may be performed by the apparatus that addresses road noise 100 or may be encoded into a computer readable medium as instructions that are executable by a computer to perform the method. Additionally, the operations in the method of FIG. 3 may be performed by an apparatus that addresses road noise 100 embedded in a vehicle, a server that is in communication with the vehicle over a network, a combination of the server that communicates with the vehicle over a network and the apparatus that is embedded in the vehicle.

Referring to FIG. 3, information on at least one from among a location of a vehicle and a noise feature of a road on which the vehicle is traveling is determined in operation S310. Next, in operation S320, road noise cancellation information is retrieved based on the determined information on at least one from among the location of the vehicle and the noise feature of road on which the vehicle is traveling. In operation S330, a signal to cancel road noise is generated and output based on the road noise cancellation information.

Figure 4:
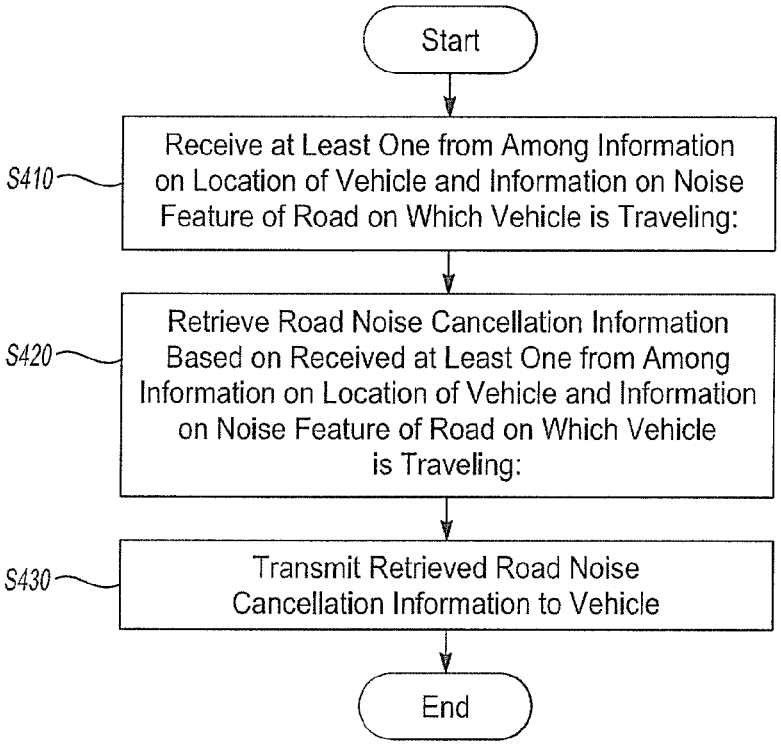
FIG. 4 shows a flowchart for a method of addressing road noise according to an aspect of another exemplary embodiment.

FIG. 4 shows a flowchart for a method of addressing road noise according to an aspect of another exemplary embodiment. The method of FIG. 4 may be performed by the apparatus that addresses road noise 100 or may be encoded into a computer readable medium as instructions that are executable by a computer to perform the method. Additionally, the operations in the method of FIG. 4 may be performed by an apparatus that addresses road noise 100 embedded in a vehicle, a server that is in communication with the vehicle over a network, a combination of the server that communicates with the vehicle over a network and the apparatus that is embedded in the vehicle.

Referring to FIG. 4, information on at least one from among a location of a vehicle and a noise feature of a road on which the vehicle is traveling is received in operation 410. Next, in operation 420, road noise cancellation information is retrieved based on the received information on at least one from among the location of the vehicle and the noise feature of road on which the vehicle is traveling. In operation 430, the retrieved road noise cancellation information is transmitted to the vehicle.

Figure 5:
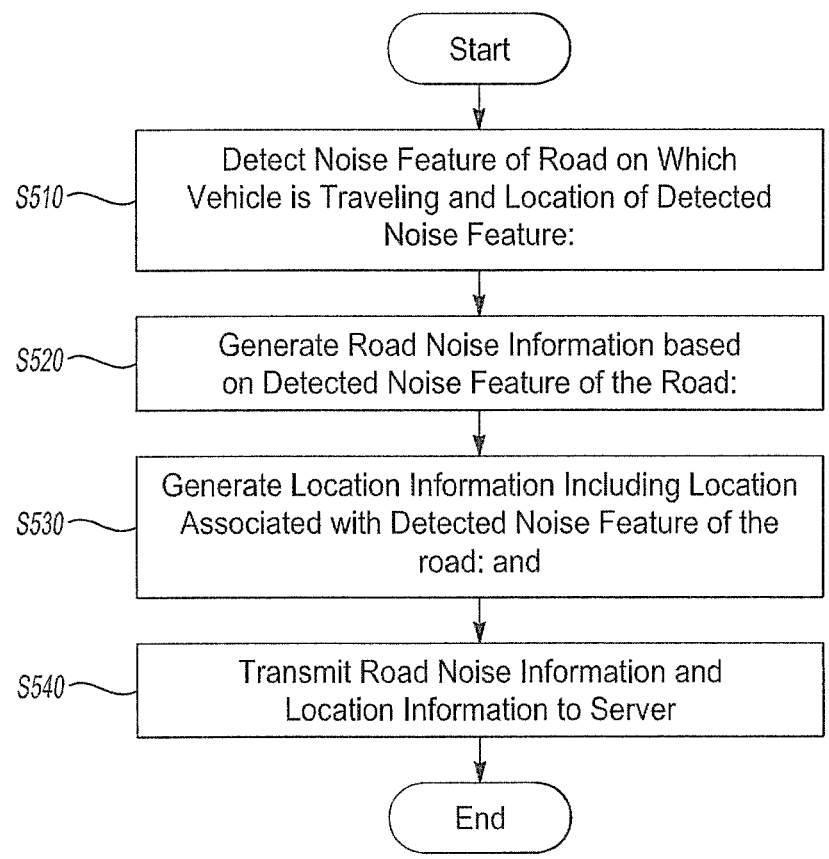
FIG. 5 shows a flowchart for a method of addressing road noise according to an aspect of another exemplary embodiment.

FIG. 5 shows a flowchart for a method of addressing road noise according to an aspect of another exemplary embodiment. The method of FIG. 5 may be performed by the apparatus that addresses road noise 100 or may be encoded into a computer readable medium as instructions that are executable by a computer to perform the method. Additionally, the operations in the method of FIG. 5 may be performed by an apparatus that addresses road noise 100 embedded in a vehicle, a server that is in communication with the vehicle over a network, a combination of the server that communicates with the vehicle over a network and the apparatus that is embedded in the vehicle.

Referring to FIG. 5, a noise feature of a road on which the vehicle is traveling and a location of the detected noise feature are detected in operation S510. Road noise information is generated based on the detected noise feature of the road in operation S520. Location information including the location associated with the detected noise feature of the road is generated in operation S530. The generated road noise information and location information are transmitted to a server in operation S540.

According to one example, one or more of the generated road noise information, information on the detected noise feature of the road, and location information may be stored locally in the vehicle. One or more of the stored road noise information, the information on the detected noise feature of the road, and the location information may then be transmitted periodically to a server, which stores the information and transmits the stored information to other vehicles in the system. For example, the stored information may be transmitted at every key cycle, on a weekly basis, on a monthly basis, on a daily basis, or upon request from a server or another vehicle.

The method of FIG. 5 may be used to collect road noise information from a plurality of vehicles along with location information associated with the collected road noise information. The collected road noise information and location information may be stored at the server and may be retrieved by a server or other vehicle and used to generate road noise cancellation information. The collected road noise information may include one or more from among information on the noise feature of the road such as severity information, a sound, a vibration, an ambient temperature, vehicle usage, a road surface type and a road surface feature. Additionally, the server may also store the road noise cancellation information, which also may be retrieved by a server or other vehicle and used to output a road noise cancellation signal.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. An apparatus for addressing road noise, the apparatus comprising:
   at least one memory comprising computer executable instructions; and
   at least one processor configured to read and execute the computer executable instructions, the computer executable instructions causing the at least one processor to:
   determine at least one from among information on a location of a vehicle and information on a noise feature of a road on which the vehicle is traveling;
   retrieve road noise cancellation information based on the determined at least one from among the information on the location of the vehicle and the information on the noise feature of the road on which the vehicle is traveling;
   retrieve information on at least one from among a route to travel on with a least amount of road noise and a lane to travel on with a least amount of road noise based on the location of the vehicle; and
   output a signal to cancel road noise based on the road noise cancellation information.

2. The apparatus of claim 1, wherein the road noise cancellation information comprises information to generate a signal that offsets noise created by the noise feature of the road.

3. The apparatus of claim 1, wherein the information on the location of the vehicle comprises at least one from among a name of a road, a name of a city, a name of a state, a name of a country, a postal code, a segment of a road, a lane of a road and coordinate information.

4. The apparatus of claim 1, wherein the information on the noise feature of the road comprises at least one from among a sound, a vibration, an ambient temperature, vehicle usage, a speed of a vehicle, a road surface type and a road surface feature.

5. The method of claim 1, wherein the computer executable instructions cause the at least one processor to retrieve the road noise cancellation information from a server.

6. The apparatus of claim 1, wherein the computer executable instructions cause the at least one processor to:
- detect a noise level inside of the vehicle;
- generate new road noise cancellation information based on the detected noise level; and
- transmit the adjusted road noise cancellation information to a server.

7. An apparatus for addressing road noise, the apparatus comprising:
- at least one memory comprising computer executable instructions; and
- at least one processor configured to read and execute the computer executable instructions, the computer executable instructions causing the at least one processor to:
- receive at least one from among information on a location of a vehicle and information on a noise feature of a road on which the vehicle is traveling;
- retrieve road noise cancellation information based on the received at least one from among the information on the location of the vehicle and the information on the noise feature of the road on which the vehicle is traveling;
- transmit the retrieved road noise cancellation information to the vehicle;
- based on the location of the vehicle, transmit at least one from among a route to travel on with a least amount of road noise and a lane to travel on with a least amount of road noise; and
- control an output signal to cancel road noise according to the transmitted road noise cancellation information.

8. The apparatus of claim 7, wherein the road noise cancellation information comprises information used to generate the signal that offsets road noise.

9. The apparatus of claim 7, wherein the information on the location of the vehicle comprises at least one from among a name of a road, a name of a city, a name of a state, a name of a country, a postal code, a segment of a road, a lane of a road and coordinate information.

10. The apparatus of claim 7, wherein the information on the noise feature of the road comprises at least one from among a sound, a vibration, an ambient temperature, vehicle usage, a speed of a vehicle, a road surface type and a road surface feature.

11. The apparatus of claim 7, wherein the computer executable instructions cause the at least one processor to:
- receive adjusted road noise cancellation information generated by detecting a noise level inside of the vehicle after the transmitted road noise cancellation information is applied; and
- replace the road noise cancellation information with the received adjusted road noise cancellation.

12. The apparatus of claim 7, wherein the computer executable instructions cause the at least one processor to:
- receive a noise level of an inside of the vehicle;
- generate new road noise cancellation information based on the received noise level; and
- transmit the adjusted road noise cancellation information to the vehicle.

13. An apparatus for addressing road noise, the apparatus comprising:
- at least one memory comprising computer executable instructions; and
- at least one processor configured to read and execute the computer executable instructions, the computer executable instructions causing the at least one processor to:
- detect a noise feature of a road on which a vehicle is traveling and a location of the detected noise feature;
- generate road noise information based on the detected noise feature of the road;
- generate location information including the location of the detected noise feature of the road;
- transmit the road noise information and the location information to a server;
- receive information on at least one from among a route to travel on with a least amount of road noise and a lane to travel on with a least amount of road noise based on the location of the vehicle; and
- control an output signal to cancel road noise according to the road noise cancellation information.

14. The apparatus of claim 13, wherein the location of the vehicle comprises at least one from among a name of a road, a name of a city, a name of a state, a name of a country, a postal code, a segment of a road, a lane of a road and coordinate information.

15. The apparatus of claim 13, wherein the detected noise feature of the road comprises at least one from among a sound, a vibration, an ambient temperature, vehicle usage, a speed of a vehicle, a road surface type and a road surface feature.

16. A system for addressing road noise, the system comprising:
- a client device; and
- a server,
- wherein the client device is configured to determine at least one from among a location of a vehicle and a noise feature of a road on which the vehicle is traveling, receive road noise cancellation information based on the determined at least one from among the location of the vehicle and the noise feature of the road on which the vehicle is traveling from the server, and output a signal to cancel road noise based on the received road noise cancellation information,
- wherein the server is configured to receive the at least one from among the location of the vehicle and the noise feature of the road on which the vehicle is traveling, retrieve the road noise cancellation information based on the received at least one from among the location of the vehicle and the noise feature of the road on which the vehicle is traveling, and transmit the retrieved road noise cancellation information to the client, and
- wherein the server is further configured to transmit information on at least one from among a route to travel on with a least amount of road noise and a lane to travel on with a least amount of road noise based on the location of the vehicle.

17. The system of claim 16, wherein the location of the vehicle comprises at least one from among a name of a road, a name of a city, a name of a state, a name of a country, a postal code, a segment of a road, a lane of a road and coordinate information.

18. The system of claim 16, wherein the detected noise feature of the road comprises at least one from among a sound, a vibration, an ambient temperature, vehicle usage, a speed of a vehicle, a road surface type and a road surface feature.

* * * * *